US012668463B2

(12) United States Patent
Eggert

(10) Patent No.: US 12,668,463 B2
(45) Date of Patent: Jun. 30, 2026

(54) INCREASED STABILITY LIFTING GEAR

(71) Applicant: LIEBHERR-WERK BIBERACH GMBH, Biberach an der Riss (DE)

(72) Inventor: Michael Eggert, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 337 days.

(21) Appl. No.: 18/448,537

(22) Filed: Aug. 11, 2023

(65) Prior Publication Data

US 2023/0399207 A1 Dec. 14, 2023

Related U.S. Application Data

(63) Continuation of application No. PCT/EP2022/053274, filed on Feb. 10, 2022.

(30) Foreign Application Priority Data

Feb. 12, 2021 (DE) .................... 10 2021 103 320.9

(51) Int. Cl.
*B66C 23/82* (2006.01)
*B66C 13/18* (2006.01)
*B66C 23/90* (2006.01)

(52) U.S. Cl.
CPC ............ *B66C 23/825* (2013.01); *B66C 13/18* (2013.01); *B66C 23/905* (2013.01)

(58) Field of Classification Search
CPC ..... B66C 23/82; B66C 23/821; B66C 23/823; B66C 23/825; B66C 23/826; B66C 23/828; B66C 13/18; B66C 23/905
See application file for complete search history.

(56) References Cited

U.S. PATENT DOCUMENTS 6,550,624 B1 * 4/2003 Irsh ....................... B66C 23/823 52/118
7,137,518 B2 * 11/2006 Irsch ..................... B66C 23/828 52/118

(Continued)

FOREIGN PATENT DOCUMENTS

DE 10022600 7/2001
DE 102010038218 4/2012

(Continued)

OTHER PUBLICATIONS

WO 2009/135662 A1 Machine Translation (Year: 2009).*

*Primary Examiner* — Robert W Hodge
*Assistant Examiner* — Juan J Campos, Jr.
(74) *Attorney, Agent, or Firm* — Levine Bagade Han LLP

(57) ABSTRACT

The present invention relates to lifting gear, more particularly a crane, such as a rotary tower crane and/or mobile crane, having a supporting structure, a determination device for determining a load state and/or an operating state of the supporting structure, and a control unit for controlling actuators of the lifting gear depending on the determined load state and/or operating state, wherein the actuators are allocated to the supporting structure for the active bracing and/or deformation of the supporting structure in a variable manner during lifting gear operation, and the control unit is configured to temporarily and variably brace and/or deform the supporting structure by means of the actuators depending on the detected load state and/or operating state in order to relieve the load on supporting structure parts which are subject to high load.

17 Claims, 2 Drawing Sheets

(56) References Cited

U.S. PATENT DOCUMENTS

| | | | | |
|---|---|---|---|---|
| 10,696,526 | B2 * | 6/2020 | Weckbecker | B66C 15/00 |
| 11,084,693 | B2 * | 8/2021 | Weckbecker | B66C 13/18 |
| 2004/0040926 | A1 * | 3/2004 | Irsch | B66C 23/828 212/347 |
| 2018/0044149 | A1 * | 2/2018 | Weckbecker | B66C 23/88 |
| 2018/0065835 | A1 * | 3/2018 | Haase | B66C 23/88 |
| 2018/0134528 | A1 * | 5/2018 | Oka | B66C 13/20 |
| 2020/0299112 | A1 * | 9/2020 | Weckbecker | B66C 23/825 |
| 2023/0399207 | A1 * | 12/2023 | Eggert | B66C 23/905 |

FOREIGN PATENT DOCUMENTS

| | | | | |
|---|---|---|---|---|
| DE | 102015202734 | | 8/2016 | |
| DE | 102017126386 | | 5/2018 | |
| DE | 102018005068 | | 1/2020 | |
| WO | WO-2009135662 | A1 * | 11/2009 | B66C 23/825 |
| WO | WO 2016/131753 | | 8/2016 | |
| WO | WO 2022/171750 | | 8/2022 | |

* cited by examiner

INCREASED STABILITY LIFTING GEAR

CROSS-REFERENCE TO RELATED APPLICATIONS

This application is a continuation of International Patent Application Number PCT/EP2022/053274 filed Feb. 10, 2022, which claims priority to German Patent Application Number DE 10 2021 103 320.9 filed Feb. 12, 2021, both of which are incorporated herein by reference in their entireties.

BACKGROUND

The present invention relates to lifting gear, more particularly cranes such as rotary tower cranes and/or mobile cranes, having a supporting structure, a determination device for determining a load state and/or an operating state of the supporting structure, and a control unit for controlling actuators of the lifting gear depending on the determined load state and/or operating state.

Cranes such as rotary tower cranes or mobile or telescopic boom cranes usually have slender, elongated supporting structures, often comprising truss girders or hollow section girders, which are frequently subjected to stress or high loads in terms of their stability and load-bearing capacity in order to reduce the deadweight of the supporting structure and thus increase the net capacity load that can be lifted. In this respect, guy ropes or rods and struts are often used to prevent excessive bending of the long, slender support elements, such as the boom or even the tower, or even stability failure, and to maintain the desired safety levels for lifting gear. Nevertheless, depending on the load state and/or operating state, very high loads are applied to the supporting structure, which often pushes the stability and deformability of the supporting structure to its limits, unless significant oversizing of the supporting and tensioning elements is undertaken, which would meet all eventualities of operating loads, but would affect the net capacity load and weight for transport in an undesirable way.

This or a similar problem applies not only to the above-mentioned rotary tower cranes and/or mobile cranes, but also to other types of cranes such as harbor or maritime cranes, derrick cranes or other lifting gear such as cable excavators with long, slender booms.

A particular challenge for the design of the supporting structure is the changing operating influences. On the one hand, not only the loads to be suspended change, but also dynamic loads caused by movements of the crane, for example by up and down luffing of the boom by a luffing drive, twisting of the boom about an upright axis by a slewing gear, moving of a trolley along the boom by a trolley drive, lifting of a slung load by a hoist drive or telescoping in and out of the boom by a telescoping drive, as well as the accompanying accelerations when these movements are started or braked. In addition, there are also other external loads such as for example wind forces or also vibration loads due to pendulum movements of the load or vibration loads due to jerky setting down or lifting of the loads.

In order to ensure adequate safety, the aforementioned loads per se must be taken into account cumulatively and the supporting structure of the lifting gear must be dimensioned accordingly. In doing so, however, overdimensioning and the associated weight disadvantage should be avoided in order to prevent losses in net capacity load as far as possible.

Typically, such cranes and similar lifting gear have a central control unit that monitors the load condition of the crane and restricts the operation of the actuators if the threat of overloading the crane is imminent. By means of a corresponding sensor system, the control unit usually monitors the load taken up and its outreach in order to prevent excessive tilting moments that would endanger the stability of the crane. For very small outreaches, the ultimate load per se or how it is received is also limited in order to avoid structural failure. It is also known to monitor pendulum movements of the load and associated deformations of the supporting structure in order to provide pendulum damping when controlling the drives or actuators.

However, the monitoring and countermeasures used to date have not been able to cope with the problem that, due to the variety of load conditions and external influences, the supporting structure of the lifting gear is loaded to its limits at determined portions or parts, while other supporting structure portions or parts still have greater load reserves. As the loading conditions and influences change, these load differences shift, which in practice has so far led to supporting structures often being oversized, at least in parts, or conversely, structural failure can occur in specific loading scenarios if individual structural sections are not sufficiently adapted to the particular loading scenario by appropriate dimensioning.

It is therefore the underlying object of the invention to provide an improved lifting gear of the type mentioned, which avoids the disadvantages of the prior art and develops the latter in an advantageous manner. The aim is more particularly to increase the stability of the supporting structure and thus safety during crane or lifting gear operation under a wide range of changing load influences, and thus to achieve a further increase in load capacity without having to sacrifice unnecessary material and weight. Preferably, a reduction of deformations as well as a prevention or elimination of vibrations should also be achieved in order to reliably prevent failure even under alternating loads, even in the case of very lightweight supporting structures that are at risk of stability failure.

SUMMARY

According to the invention, said task is solved by a lifting gear as claimed in claim 1. Preferred embodiments of the invention are the subject of the dependent claims.

It is therefore proposed to use actuators to actively manipulate the supporting structure and adapt it to the changing loads and influences during operation. According to the invention, it is proposed to allocate actuators to the supporting structure for actively bracing and/or deforming the supporting structure in a variable manner during lifting gear operation, and to configure the control unit to temporarily and variably brace and/or deform the supporting structure by means of the actuators for relieving the load on supporting structure parts subject to high load, depending on the respectively determined load state and/or operating state that changes during operation. The supporting structure can be actively and variably deformed and/or braced online during lifting gear operation by the allocated actuators and thus adapted to the changing loads and external influences during operation in order to prevent overloading of individual supporting structure parts and to even out the loads in the supporting structure.

This approach is therefore not aimed at minimizing external and internal influences by using the drives classically present on a crane, as is the case, for example, with load sway damping by selective control of the trolley, hoisting and slewing gears, or with load moment limitation by restricting the movements of the hoisting and trolley drives; instead, active manipulation of the supporting structure is provided by variable bracing and/or variable deformation of supporting structure elements online during lifting gear operation in accordance with the load and operating state determined in each case.

In particular, the control unit can control the actuator for the active, variable bracing and/or deformation of the supporting structure online during operation in such a way that the supporting structure parts currently critically loaded by the respective determined load state and/or operating state are relieved and other supporting structure parts still having load-bearing capacity reserves are loaded more heavily. The active control of the actuators online during lifting gear operation, if possible, in real time, allows a significantly better distribution of the load on the supporting structure, adapted to the varying loads and influences. Depending on the situation, this distribution or redistribution of loads can be controlled in different ways.

The determination device for determining the load state and/or operating state can advantageously have an identification device for identifying a most heavily loaded supporting structure part that comes closest to its stability limit, or several such most heavily loaded supporting structure parts and/or for identifying one or several supporting structure parts still having stability reserves, so that the control unit can actuate the actuator system in a targeted manner depending on the supporting structure parts identified as being at risk and/or still having reserves, in order to achieve the said redistribution, i.e., to relieve the most heavily loaded or exhausted supporting structure parts and/or to place greater loads on supporting structure parts still having reserves. i.e. to relieve the load on the most heavily loaded or exhausted supporting structure parts and/or to increase the load on supporting structure parts with even greater reserves.

Advantageously, said determination device may have a computational model, which may be implemented, for example, in the form of a software tool of an electronic computing unit, which detects and/or estimates and/or otherwise determines data relating to the load state and/or operating state of the supporting structure by means of a predetermined algorithm and/or predetermined determination rules to determine or identify the currently critically loaded and/or the currently less loaded parts of the supporting structure with capacity load reserve. The algorithm or the determination rules mentioned do not have to be predetermined within the meaning of being rigidly fixed, but can be adapted adaptively in a learning system, as will be explained in more detail.

In a further development of the invention, said supporting structure of the lifting gear may comprise at least a boom and possibly a tower supporting the boom, in which case the actuators may be designed to actively brace and/or actively deform said boom and possibly also the tower, wherein the active bracing and/or deformation of the boom and/or the tower is variably adapted to the respective determined load state and/or operating state. A load suspension means can run from said boom, for example in the form of a load hook, but depending on the type of machine, other load suspension means such as a cable excavator grab can also be provided.

In particular, the control unit can be designed to shorten supporting structure parts subjected to tension and/or lengthen supporting structure parts subjected to compression by means of the actuators mentioned.

For example, the supporting structure may comprise longitudinal chords that may be connected by cross braces or other connecting elements, wherein in this case the actuators may be designed to lengthen and/or shorten said longitudinal chords of the supporting structure depending on whether the respective longitudinal chord is subjected to tension or subjected to compression in the respective load state and/or operating state.

Alternatively, or additionally to the adjustment of longitudinal chords, the actuator can also be designed to actively adjust a bracing cable and/or bracing rods of the supporting structure online in operation depending on the respective determined load state and/or operating state, for example bracing cables and/or bracing rods which can be designed to be telescopic, and/or shorten a bracing strut, which can support and/or spread the bracing tensioning means transversely to its longitudinal direction, in order to actively brace and/or deform supporting structure parts braced by the bracing and/or variably counteract load-induced deformation online during operation.

In general, the control unit can control the actuator in such a way that the geometry of the bracing strut is adjusted, for example by shortening or lengthening a bracing strut or changing a spread angle of a bracing strut, so that, for example, the angle of spread of a butterfly bracing can be changed. Alternatively, or additionally, however, the geometry of the bracing can also be achieved by lengthening and/or shortening individual or a plurality of bracing elements, for example to straighten a support structure element braced by it or to deform it to a lesser or greater extent. If, for example, lifting a heavy load at half the radius results in greater deflection of a rotary tower crane boom within the meaning of a water-retaining beam, a bracing cable attached further out on the boom can, for example, be lengthened and/or a bracing cable attached in the central portion can be shortened and/or a cross strut of the bracing going to the central portion can be shortened in order to act against said deflection of the boom by adjusting the geometry of the bracing accordingly.

Alternatively, or in addition to such an adjustment of the geometry of the bracing, it may also be sufficient to change the bracing of the bracing, for example, to increase a tensile force in one bracing line and/or to decrease the tensile force in another bracing line, without having to change the geometry immediately.

Advantageously, the control unit for manipulation of the supporting structure takes into account a variety of parameters describing the load state and/or an operating state of the lifting gear. The parameters mentioned can reflect internal, i.e. operator-initiated, influences on the crane structure, such as movements of the crane, which can be detected by the determination device, for example by sensors. Other internal influencing variables, such as the set-up condition of the crane, can also be determined by the determination device, for example detected by sensors or determined by inputting or selecting set-up condition data. Furthermore, the aforementioned parameters characterizing the operating condition can also include settings that can be adjusted during operation, such as the luffing angle of a boom, the spread angle of a butterfly bracing system, or the telescoped length of a telescopic boom.

However, parameters can also characterize external influences on the lifting gear, for example wind loads acting on the lifting gear, which the determination device detects directly by sensors, for example with regard to speed and direction, or also detects indirectly, for example by detecting the strains or tensions on the supporting structure caused by the wind.

Advantageously, all or at least some of the data detected by the sensor system can be checked or processed online for plausibility or errors in a central computer unit and/or in several decentralized computer units during lifting gear operation.

Non-measurable quantities can be estimated using other known quantities, for example, using a system dynamics estimation model. For example, the deflection of a boom tip, which is difficult to measure, can be estimated by considering the set-up condition and the loading condition of the boom.

The aforementioned centralized and/or decentralized computing units can advantageously be equipped with routines and/or rules for handling fault cases such as the failure of relevant components.

Independently thereof, said central and/or decentralized computing units may also be connected to other monitoring devices, such as a stability monitoring device, in order to limit, depending on a signal from these further monitoring devices, the actions of the actuator system intended for manipulating the supporting structure.

Alternatively, or additionally, the at least one computing unit may also comprise prediction means for predicting a change in the operating condition, wherein such prediction means may comprise, for example, estimation means and/or software tools such as deep learning or artificial intelligence. In particular, said prediction device can be designed to make predictions, based on past hoisting operations and taking into account their boundary conditions, as to how the currently determined operating and/or loading condition is likely to change and which measures of the actuator are reasonable and/or permissible for manipulating the supporting structure for such a likely change.

The at least one computing unit can further be designed to distinguish external from internal influences based on the processed data on a computational model.

The control unit can provide for active manipulation of the supporting structure during both increases and decreases in internal and external influences.

The control unit can perform the actuation of the actuators for active manipulation of the supporting structure semi-automatically or fully automatically, wherein semi-automatic actuation of the actuators being able to provide that suggestions for manipulation of the supporting structure are made to a hoist operator, who can then perform them at his own discretion. Alternatively, or additionally, the control unit can also have a fully automatic operating mode in which the control unit controls and actuates the actuators for manipulating the supporting structure completely autonomously or fully automatically depending on the determined load and operating condition data.

BRIEF DESCRIPTION OF THE DRAWINGS

The present invention is explained in more detail below with reference to preferred embodiments and associated drawings. The drawings show.

DETAILED DESCRIPTION

Figure 1:
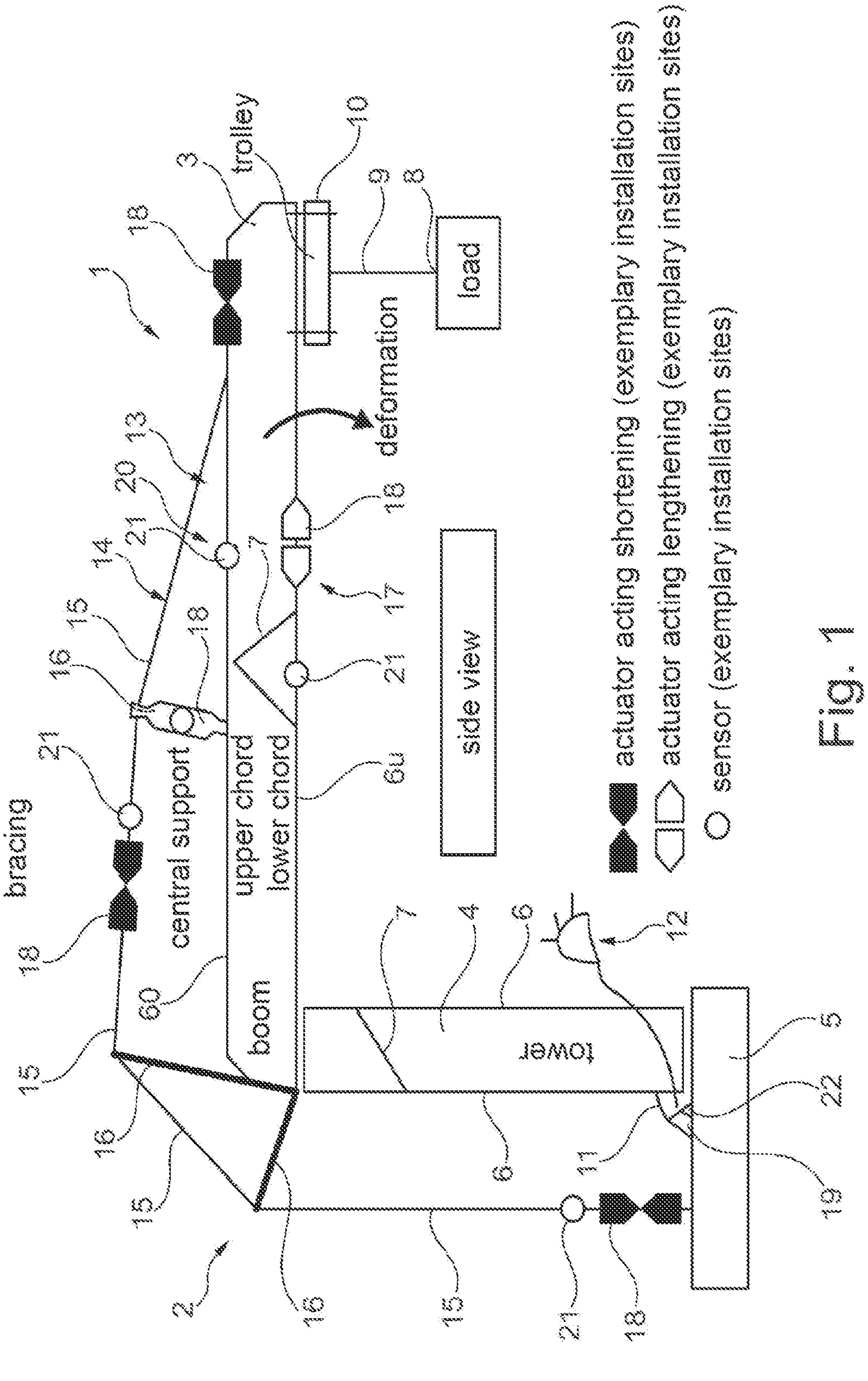
FIG. 1: a side view of a lifting gear in the form of a rotary tower crane boom according to an advantageous embodiment of the invention, in which the actuator system for manipulating the supporting structure comprises various actuators for adjusting a bracing and the upper and lower chords of the crane boom, and this sensor system for detecting load and operating condition data comprises a plurality of sensors on the boom and the bracing.

As shown in the figures, the lifting gear 1 may be designed in the form of a crane 2, wherein as an example there is shown a tower crane. The crane 2 can comprise a boom 3, which can be luffed up and down about a horizontal axis by a luffing mechanism, cf. FIG. 3. Independently thereof, the boom 3 can sit on a tower 4, which can be designed to be telescopic and/or foldable, more particularly if the crane is designed as a mobile fast-erecting crane. Said tower 4 may, for example, be seated on a rotatable superstructure 5, so that the boom 3 is rotatable together with the tower 4 about an upright axis of rotation by a slewing gear, but possibly also the boom 3 can be rotatable relative to the tower 4 about the upright axis if it is a top slewing gear. Said superstructure 5 may be seated on an undercarriage designed as a truck or on a crawler chassis or similar.

Said boom 3 and/or tower 4 may be designed as a hollow section and/or bar structure or a hybrid thereof. For example, the boom 3 and possibly also the tower 4 may comprise longitudinal chords 6, which may be interconnected by cross struts 7. In case of the boom 3, said longitudinal chords 6 are referred to as upper and lower chords, cf. FIG. 1.

A load suspension means 8 can run from the boom 3, for example in the form of a load hook, and the hollow point can be moved along the boom 3 by a trolley 10, cf. FIG. 1. The hoist rope 9 running off the trolley 10 can be retracted and released by a hoist drive for raising and lowering the load suspension means 8. Further drive devices not shown in more detail may be provided for the other crane movements, such as in particular a slewing gear drive for rotating the boom 3 about the upright axis, a trolley drive for adjusting the trolley 10, a luffing drive for luffing the boom 3 up and down, cf. FIG. 3, and possibly a telescoping drive for telescoping the boom and/or the tower in and out.

An electronic control unit 11 controls said drive devices and may cooperate with or include a monitoring device 12 to restrict or prevent crane movement if the stability of the crane is compromised. Such a monitoring device 12 can, for example, monitor the tilting moment acting on the crane 2, wherein for this purpose, for example, the outreach and the load picked up can be monitored, for example by sensory detection of the trolley position and sensory determination of the hoist rope force. However, possibly other or additional monitoring sensors can detect, for example, strains or reaction forces to perform stability monitoring.

As shown in the figures, the supporting structure 13 can include a bracing 14 that can brace the boom 3 and, if necessary, the tower 4. Such bracing 14 may include one or more bracing cables and/or bracing rods and/or bracing belts and/or bracing chains or, more generally, bracing tension means which may be supported by bracing supports 16 which may extend transversely to the longitudinal direction of said bracing tension means 15.

For example, bracing means 15 may be articulated to the boom 3 and extend across the back of the boom 3 to a tower top or, as shown in FIG. 1, to a bracing support 16, which may be articulated to the boom link or to the top end portion of the tower 4. The said bracing support 16 can be articulated by a further bracing tension means 15 on the superstructure 5, for example in the area of the ballast. However, it is understood that other guides of the bracing tension means are also possible, depending on the design of the lifting gear 1. For example, a spatial bracing system can also be provided which can brace the boom 3 not only in the upright longitudinal center plane but also transversely thereto, wherein such a spatial bracing system can be designed as a butterfly bracing system, for example, in which a V-shaped bracing block 16 can be provided via which two bracing tension means can be guided to the right and left of the boom 3, on which the bracing tension means 15 can have a common attachment point or also two spaced attachment points.

In order to be able to actively manipulate, more particularly variably brace and/or brace the supporting structure 13 online during lifting gear operation, provision is made for an actuator 17 which can comprise a number of actuators 18 which can be provided on various portions of the supporting structure 13.

For example, actuators 18 can be allocated to the upper and lower chords of the boom 3 by means of which the upper and lower chords can be shortened and/or lengthened.

For example, the actuators 18 allocated to the bracing 14 may include an actuator for shortening or lengthening the boom bracing tension means and an actuator for shortening and lengthening the neck bracing tension means.

Independently thereof, an actuator 18 can also be provided for shortening and/or lengthening a bracing support 16, cf. FIG. 1.

Said actuators 18 may in principle be designed in various ways, for example comprising pressure medium or hydraulic cylinder units, wherein provision can also be made for electric actuators such as spindle drives.

Said actuator 17 can be controlled and operated by the control unit 11 to variably manipulate the supporting structure 13 depending on the current load state and/or operating state of the crane 2.

For determining said load state and/or operating state of the crane 2, a determination device 19 is provided, which may comprise a sensor system 20 for detecting load state and/or operating condition parameters. In this regard, said sensor system 20 may include a plurality of sensors 21 that may be allocated to different portions or elements of the supporting structure 13 to detect their load and/or deformation and/or position and/or movement and/or acceleration.

The sensors 21 mentioned can in principle be designed in different ways, for example comprising strain gauges or inclination sensors on the steel structure or the profile structure of the supporting structure 13 and/or force measuring elements on the bracing means 15. For example, as FIG. 1 shows, sensors 21 can detect loads and/or deformations and/or inclinations of the upper and lower chords 6 of the boom 3. Additional sensors 21 can detect tensile forces in the bracing tension means 15 extending above the boom 3 and/or along the tower 4. Further sensors 21 can be allocated to the bracing supports 16 in order to detect forces and/or deformations and/or positions and/or movements prevailing there.

Figure 2:
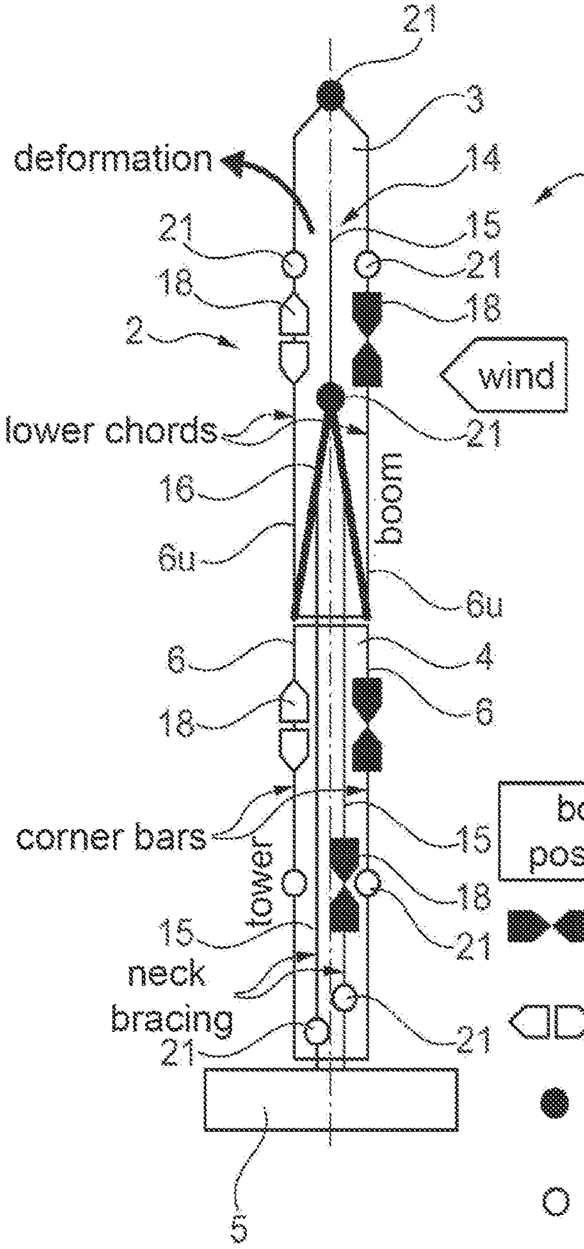
FIG. 2: a rear view of a lifting gear in the form of a tower crane similar to FIG. 1, the crane being shown in a cross-wind loading situation.

As FIG. 2 shows, further sensors 21 may be provided for detecting external influences such as wind load, wherein such sensors 21 may include, for example, wind speed gauges on one or different portions of the supporting structure 13. As FIG. 2 shows, for example, such a wind speed sensor may be provided at the tip of the boom 3 and the tip of a bracing support 16. Advantageously, such a wind sensor can also detect or determine the wind direction, more particularly whether the wind is coming across the boom 3 and at what angle.

As described above, the sensor system 20 can include various other sensors to detect other load state and/or operating condition parameters, for example, the set-up condition, the boom luffing position, the weight of the load supported by the load suspension means 8, the position of the trolley 10, or other variables relevant to the load and operating condition of the supporting structure 13.

For load and/or operating condition parameters that are difficult to measure, the determination device 19 may also include an estimation module that estimates the corresponding parameter based on the available system variables. Said estimation device may be implemented in the electronic control unit 11.

As the example of FIG. 1 illustrates, the control unit 11 can actively manipulate the supporting structure 13 by means of the actuators 18 depending on internal influences in order to increase or at least ensure the stability of the supporting structure 13. If, for example, a load is to be lifted by the load suspension means 8, the control unit 11 can proceed as follows:

Via the sensor system 20, all necessary or helpful parameters of the load state and/or an operating state are detected and possibly additional parameters are estimated by the aforementioned submission of estimates. In particular, the determination device 19 can determine the set-up condition of the crane via the aforementioned sensor system 20 and possibly the estimation device 22, in particular the support and/or guy geometry, the ballasting, the tower height, the boom length and/or other relevant set-up condition variables such as permissible maximum travel speeds. Alternatively, or additionally, the determination device 19 determines the angular position of the boom 3 and/or the positioning of the trolley 10 on the boom 3 and/or the resulting maximum lifting load and/or maximum lifting speed. The aforementioned information can already be known or made available to the control unit 11 before the intended crane movement. The actual lifting movement is only indicated on the control unit 11 by actuating an operating element, for example in the form of a joystick, wherein the lifting movement can also be part of an automatically controlled travel movement of the crane. If the lifting movement of the crane control system is known or indicated, the actual lifting load and speed can be determined by the sensor system 20, for example by a load measuring axis and a speedometer on the lifting mechanism. At the same time, other sensors that may be attached to the supporting structure of the crane 2, for example in the form of strain gauges and/or inclination sensors on the steel structure and/or force measuring elements on the bracing cables, can detect the responses to the mechanical effect(s) of the lifting movement.

The control unit 11 can check and process the above data for correctness or plausibility in the manner described at the beginning. Quantities that cannot be detected by sensors or are difficult to detect, such as the deformation of the boom tip, can be calculated and/or estimated with sufficient accuracy based on other information such as the length and angle of the boom 3 and the guy geometry.

In addition to mechanical stresses or loads, other serviceability criteria such as deformation of the supporting structure 13 can also be detected by sensors or determined in other ways by the determination device 19.

To counteract excessive loads and/or deformations, various actuator strategies can be applied by the control unit 11. For example, by actuating the corresponding actuators 18, the control unit 11 can shorten the length of components subjected to tension and/or lengthen components subjected to compression and/or use both strategy approaches in combination. For example, the bracing tension means 15 and/or the upper chord 60 of the boom 3 can be shortened by the corresponding actuators 18. Alternatively, or additionally, for example, the lower chords 6*u* of the boom 3 and/or a bracing support 16, which may be hinged in a central section of the boom 3, may be lengthened by the corresponding actuators 18.

By shortening the upper chord and/or lengthening the lower chords and/or lengthening the center support and/or shortening the bracing tension means, the deformation of the boom 3 can be actively manipulated, wherein the control unit 11 can variably adjust this active manipulation depending on the load state and/or operating state currently determined by the determination device 19 in each case.

Figure 3:
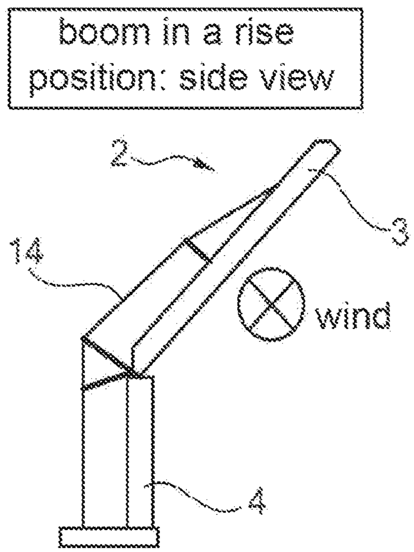
FIG. 3: a side view of the lifting gear from FIG. 2, showing a raised position of the boom.

As shown in FIGS. 2 and 3, the control unit 11 can also control or adjust the active manipulation of the supporting structure 13 depending on external influences such as crosswinds.

In the example of FIGS. 2 and 3, the sensor system 20 can measure directly via the aforementioned wind sensors 21 and direction. Alternatively, or additionally, mechanical effects of the wind such as stresses, strains, angular changes, slip or rotational forces can also be detected by the sensor system 21, wherein redundant wind detection can possibly be performed.

The detection of external influences such as the crosswind mentioned, for example, is advantageously carried out in addition to the detection or determining of the system variables explained for the example of FIG. 1.

For example, if we consider the crane 2 with a boom 3 standing steeply, as shown in FIGS. 2 and 3, both the tower 4 and the boom 3 are deformed in the wind direction. In order to counteract such deformation, the control unit 11 can control the actuators 15 depending on the parameters characterizing the wind load, more particularly to shorten the length of components subjected to tensile loads, for example parts of the bracing 14 and/or the lower chord 6*u* of the boom 3 facing the wind and/or the corner bars or longitudinal chords 6 of the tower 4 facing the wind. Alternatively, or additionally, the control unit 11 may also cause components subjected to compression to be lengthened by corresponding actuation of the actuators 18, for example parts of the bracing 14, a lower chord of the boom 3 facing away from the wind and/or corner bars of the tower 4 facing away from the wind.

As shown more particularly in FIG. 2, for example, a neck bracing facing the wind can be shortened by a corresponding actuator 18. Alternatively, or additionally, the lower chord 6*u* facing away from the wind can be lengthened by actuating the actuator 18 allocated to the lower chord 6*u*.

I claim:

1. A lifting gear comprising:

a rotary tower crane or a mobile crane comprising:

a supporting structure;

a determination device for determining a load state and/or an operating state of the supporting structure; and a control unit for controlling actuators of the lifting gear in response to the determined load state and/or to the determined operating state, wherein the controlling actuators are allocated to the supporting structure for the active bracing or deformation of the supporting structure in a variable manner during lifting gear operation, and wherein the control unit is configured to temporarily and variably brace or deform the supporting structure with the actuators in response to the detected load state and/or to the detected load state operating state such that to relieve load on supporting structure parts that are subject to high load, wherein the supporting structure comprises at least one boom, from which a load suspension is suspended, wherein the actuators are configured to variably brace or deform the boom during lifting gear operation, wherein a tower is suspended from the at least one boom, and wherein the actuators are configured to variably brace or deform the tower during lifting gear operation.

2. The lifting gear of claim 1, wherein the actuators are configured to variably lengthen or shorten longitudinal chords of the boom and/or of the tower during operation.

3. The lifting gear of claim 1, wherein the determination device is configured to identify the supporting structure parts subjected to compression during lifting gear operation and/or supporting structure components subjected to tension during lifting gear operation, and wherein the control unit is configured to shorten the supporting structure parts subjected to tension during lifting gear operation or lengthen the supporting structure parts subjected to compression during lifting gear operation with the actuators.

4. The lifting gear of claim 1, wherein the determination device is configured to determine a wind load acting on the supporting structure, wherein the control unit is configured to shorten at least one supporting structure portion arranged on a windward side or to lengthen at least one supporting structure portion arranged on a leeward side, depending on the determined wind load.

5. The lifting gear of claim 4, wherein the wind load comprises a wind speed and a wind direction.

6. The lifting gear of claim 5, wherein the control unit with the actuators variably lengthens a leeward lower chord of a boom and/or leeward corner bars of a tower depending on the determined wind load or variably shortens a windward lower chord of the boom and/or windward corner bars of the tower and/or a windward tensioning element depending on the determined wind load.

7. The lifting gear of claim 6, wherein the determination device comprises at least one wind speed sensor and at least one wind direction sensor for determining the wind speed, and wherein the control unit is configured to temporarily manipulate the supporting structure with the actuators in a variable manner depending on a detected wind speed and a detected wind direction.

8. The lifting gear of claim 5, wherein the determination device comprises at least one wind speed sensor and at least one wind direction sensor for determining the wind speed, and wherein the control unit is configured to temporarily manipulate the supporting structure with the actuators in a variable manner depending on a detected wind speed and a detected wind direction.

9. The lifting gear of claim 1, wherein the determination device comprises a sensor system for detecting deformations and/or loads of a boom and/or a tower, and wherein the control unit is configured to actively manipulate the supporting structure with the actuators depending on sensor signals of said sensor system during lifting gear operation.

10. The lifting gear of claim 1, wherein the determination device comprises a sensor system for determining at least one load and/or operating condition parameter from the following group of parameters: set-up condition, support geometry, ballasting, tower height, boom length, boom angle position, trolley position, maximum possible lifting load, maximum possible lifting speed, actual lifting load, actual lifting speed, lifting rope force and supporting structure deformations; and wherein the control unit is configured to actively manipulate the supporting structure during lifting gear operation with the actuators depending on the sensor signals of the sensor system.

11. The lifting gear according to claim 1, wherein the determination device comprises an estimation device for estimating at least one set-up condition and/or operating condition parameter on the basis of an existing set-up condition and/or load and/or operating condition data, and wherein the control unit is configured to actively manipulate the supporting structure with the actuators depending on the at least one estimated set-up condition and/or operating condition parameter.

12. The lifting gear of claim 1, wherein the determination device comprises a prediction device configured to predict a future load state and/or operating state on the basis of stored data on past lifting gear operations including past listing gear load and operating state data, wherein the control unit is configured to actively manipulate the supporting structure depending on the predicted load state and/or operating state with the actuators.

13. The lifting gear of claim 1, wherein the determination device is configured to identify supporting structure parts with lower load capacity reserve and/or stability reserve and supporting structure parts with comparatively higher load capacity reserve and/or stability reserve, wherein the control unit is configured to actively brace or deform the supporting structure depending on the identified supporting structure parts with lower and/or comparatively higher load capacity reserve and/or stability reserve with the actuators so the load capacity reserves and/or stability reserves of the supporting structure parts are made uniform and/or supporting structure parts with lower load capacity reserve and/or stability reserve are relieved and/or supporting structure parts with comparatively higher load capacity reserve and/or stability reserve are loaded.

14. A lifting gear comprising:

a rotary tower crane or a mobile crane comprising:

a supporting structure;

a determination device for determining a load state and/or an operating state of the supporting structure; and a control unit for controlling actuators of the lifting gear in response to the determined load state and/or to the determined operating state, wherein the controlling actuators are allocated to the supporting structure for the active bracing or deformation of the supporting structure in a variable manner during lifting gear operation, and wherein the control unit is configured to temporarily and variably brace or deform the supporting structure with the actuators in response to the detected load state and/or to the detected load state operating state such that to relieve load on supporting structure parts that are subject to high load, wherein the determination device is configured to determine a wind load acting on the supporting structure, wherein the control unit is configured to shorten at least one supporting structure portion arranged on a windward side or to lengthen at least one supporting structure portion arranged on a leeward side, depending on the determined wind load, wherein the wind load comprises a wind speed and a wind direction, wherein the control unit with the actuators variably lengthens a leeward lower chord of a boom and/or leeward corner bars of a tower depending on the determined wind load or variably shortens a windward lower chord of the boom and/or windward corner bars of the tower and/or a windward tensioning element depending on the determined wind load.

15. A lifting gear comprising:

a rotary tower crane or a mobile crane comprising:

a supporting structure;

a determination device for determining a load state and/or an operating state of the supporting structure; and a control unit for controlling actuators of the lifting gear in response to the determined load state and/or to the determined operating state, wherein the controlling actuators are allocated to the supporting structure for the active bracing or deformation of the supporting structure in a variable manner during lifting gear operation, and wherein the control unit is configured to temporarily and variably brace or deform the supporting structure with the actuators in response to the detected load state and/or to the detected load state operating state such that to relieve load on supporting structure parts that are subject to high load, wherein the determination device comprises an estimation device for estimating at least one set-up condition and/or operating condition parameter on the basis of an existing set-up condition and/or load and/or operating condition data, and wherein the control unit is configured to actively manipulate the supporting structure with the actuators depending on the at least one estimated set-up condition and/or operating condition parameter.

16. A lifting gear comprising:

a rotary tower crane or a mobile crane comprising:

a supporting structure;

a determination device for determining a load state and/or an operating state of the supporting structure; and a control unit for controlling actuators of the lifting gear in response to the determined load state and/or to the determined operating state, wherein the controlling actuators are allocated to the supporting structure for the active bracing or deformation of the supporting structure in a variable manner during lifting gear operation, and wherein the control unit is configured to temporarily and variably brace or deform the supporting structure with the actuators in response to the detected load state and/or to the detected load state operating state such that to relieve load on supporting structure parts that are subject to high load, wherein the determination device comprises a prediction device configured to predict a future load state and/or operating state on the basis of stored data on past lifting gear operations including past listing gear load and operating state data, wherein the control unit is configured to actively manipulate the supporting structure depending on the predicted load state and/or operating state with the actuators.

17. A lifting gear comprising:

a rotary tower crane or a mobile crane comprising:

a supporting structure;

a determination device for determining a load state and/or an operating state of the supporting structure; and a control unit for controlling actuators of the lifting gear in response to the determined load state and/or to the determined operating state, wherein the controlling actuators are allocated to the supporting structure for the active bracing or deformation of the supporting structure in a variable manner during lifting gear operation, and wherein the control unit is configured to temporarily and variably brace or deform the supporting structure with the actuators in response to the detected load state and/or to the detected load state operating state such that to relieve load on supporting structure parts that are subject to high load, wherein the determination device is configured to identify supporting structure parts with lower load capacity reserve and/or stability reserve and supporting structure parts with comparatively higher load capacity reserve and/or stability reserve, wherein the control unit is configured to actively brace or deform the supporting structure depending on the identified supporting structure parts with lower and/or comparatively higher load capacity reserve and/or stability reserve with the actuators so the load capacity reserves and/or stability reserves of the supporting structure parts are made uniform and/or supporting structure parts with lower load capacity reserve and/or stability reserve are relieved and/or supporting structure parts with comparatively higher load capacity reserve and/or stability reserve are loaded.

* * * * *